United States Patent
Lavoie

(10) Patent No.: US 10,921,592 B2
(45) Date of Patent: Feb. 16, 2021

(54) SELF-CONTAINED BREATHING APPARATUS FACE PIECE LENS VISION SYSTEM

(71) Applicant: Barry Lavoie, Lowell, MA (US)

(72) Inventor: Barry Lavoie, Lowell, MA (US)

(73) Assignee: Smoke-I Corporation, Lowell, MA (US)

( * ) Notice: Subject to any disclaimer, the term of this patent is extended or adjusted under 35 U.S.C. 154(b) by 159 days.

(21) Appl. No.: 15/287,927

(22) Filed: Oct. 7, 2016

(65) Prior Publication Data

US 2017/0123211 A1    May 4, 2017

Related U.S. Application Data

(60) Provisional application No. 62/238,232, filed on Oct. 7, 2015.

(51) Int. Cl.
| | |
|---|---|
| *G02B 27/01* | (2006.01) |
| *H04N 5/33* | (2006.01) |
| *A62B 7/00* | (2006.01) |
| *A62B 18/02* | (2006.01) |
| *A62B 18/08* | (2006.01) |
| *G02B 13/14* | (2006.01) |
| *G06F 3/02* | (2006.01) |

(52) U.S. Cl.
CPC ........ *G02B 27/0172* (2013.01); *A62B 18/082* (2013.01); *G02B 13/14* (2013.01); *G02B 27/017* (2013.01); *G06F 3/0219* (2013.01); *G02B 2027/014* (2013.01); *G02B 2027/0129* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 6,023,061 | A * | 2/2000 | Bodkin | B64D 47/08 250/252.1 |
| 6,456,261 | B1* | 9/2002 | Zhang | A42B 3/042 345/7 |
| 9,973,692 | B2* | 5/2018 | Szabo | H04N 5/23238 |
| 2014/0320399 | A1* | 10/2014 | Kim | G02B 27/017 345/156 |
| 2015/0022446 | A1* | 1/2015 | Asplund | G06F 3/014 345/157 |
| 2015/0271420 | A1* | 9/2015 | Neal | H04N 5/33 348/164 |
| 2015/0273248 | A1* | 10/2015 | Kuutti | A62B 9/00 128/201.12 |
| 2016/0034042 | A1* | 2/2016 | Joo | G02B 27/0172 345/633 |

\* cited by examiner

*Primary Examiner* — Edemio Navas, Jr.
(74) *Attorney, Agent, or Firm* — Hsuanyeh Law Group PC

(57) ABSTRACT

The present disclosure provides a self-contained breathing apparatus having a face piece vision system. In one aspect, the vision system includes a display component having an active matrix display device and a transparent heads-up display configured to be aligned with an eye of a user wearing the self-contained breathing device, and an infrared sensor component having an infrared lens assembly and an infrared image sensor for capturing an infrared image of a potential heat source that is projected to the transparent heads-up display.

8 Claims, 4 Drawing Sheets

SELF-CONTAINED BREATHING APPARATUS FACE PIECE LENS VISION SYSTEM

This is a nonprovisional patent application claiming priority of U.S. Provisional Application for Patent No. 62/238,232 filed on Oct. 7, 2015, the complete subject matter of which is incorporated herein by reference in its entirety.

TECHNICAL FIELD

The present disclosure relates to a breathing apparatus. More particularly, the present disclosure relates to a breathing apparatus having a face piece vision system.

BACKGROUND

Currently, firefighters use hand-held thermal imaging cameras to navigate through smoke filled environments. The utility of these devices is minimized because at least one hand is required to hold them. Another deficiency with the hand-held cameras is due to the density of smoke that gets in between the hand held display and lens of the self-contained breathing apparatus face piece. Vision is impaired and the display screen on the hand held camera disappears and cannot be seen. Accordingly, there is a need to develop a new breathing device that includes an integrated thermal imaging system. Although other solutions have been presented to the fire service community in an effort to meet this need, they have yielded unfavorable results due to deficiencies in the design, specifically due to the environment in the field of view of the user is offset because the sensors are positioned too far away from the user's eye, coupled with a display that does not have see-through capability, positioned outside of the user's field of view requiring them to look away from the true environment, and towards an offset display. These systems do not compensate for parallax issues, and create a dangerous depth perception issue that can lead to injuries. Having a see through transparent display positioned directly in front of the user's eye, with an overlaid image of the scene in true scale 1:1 overlap is essential as this disclosure defines, and eliminates the deficiencies other systems have.

SUMMARY

In view of the foregoing, the present disclosure provides a self-contained breathing apparatus having an infrared sensor integrated and sealed thereon, coupled with a transparent heads-up display that projects the imagery from the infrared sensor to the eye inside of the face piece lens of the breathing apparatus, so as to optimize the firefighter's vision in smoke filled environments. This improves safety of search and rescue missions, as well as, decreases the time for a firefighter to get to the source of a fire while navigating through smoke. The incorporation of a transparent heads-up display into a breathing apparatus is important, because when the infrared sensor is not needed, the firefighter's vision is unobstructed when the camera or vision system is shut off, while the self-contained breathing apparatus face piece is still worn. Exemplary uses for the breathing apparatus include firefighting, law enforcement SWAT team raids, as well as navigating through tunnels in the mining industry.

In one aspect, the present disclosure provides a self-contained breathing device comprising a face piece lens, a seal component at an edge of the face piece lens, an air supply member at a central portion of the face piece lens, and a vision system integrated with and securely fastened to a side of the face piece lens. The vision system comprises a display component having an active matrix display device and a transparent heads-up display for receiving optical output signals projected from the active matrix display device, wherein the transparent heads-up display is configured to be aligned with an eye of a user wearing the self-contained breathing device; and an infrared sensor component having an infrared lens assembly and an infrared image sensor for capturing an infrared image of a potential heat source that is projected to the transparent heads-up display.

In one embodiment, one feature of the vision system is the elimination of moving parts, such as shutters. The camera or vision system of the present disclosure can be calibrated manually by having the user placing a hand in front of the lens assembly located in front of the infrared image sensor. Although manual calibration may not be desirable in certain cases, the elimination of additional components, such as mechanical automated shutters, reduces overall system cost and increases battery life of the image sensor. In one embodiment, another feature of the vision system is that an integrated infrared sensor is coupled to a transparent heads-up display into the self-contained breathing apparatus lens without incorporating any adjustment features needed to accommodate for parallax correction and inter-pupil distance, along with a shutter-less camera which can be calibrated in the face piece lens.

In one embodiment, the vision system further comprises a user control interface having an activation keypad for receiving user interactions and user control electronics for converting the user interactions into electronic control signals.

In one embodiment, the vision system further comprises a core control component including a power supply, a core electronic circuit electrically coupled to the power supply, and a video output terminal electrically coupled to the core electronic circuit.

In one embodiment, the core control component includes focal plane electronics electrically coupled to the infrared sensor component, control electronics for processing an electrical input signal from the infrared sensor component, and power supply electronics electrically coupled to the power supply for regulating power

DETAILED DESCRIPTION

Breathing apparatus of the present disclosure can be implemented by integrating and sealing an infrared sensor into the self-contained face piece lens. Image data can be received through a germanium front-end objective lens assembly centered on an infrared sensor. The infrared sensor data received can then be transmitted through wired signal connections to a micro-display illuminating sensor. The micro-display illuminating sensor projects pixels, which are matched to the infrared sensors pixels, into a transparent heads-up display, or beam splitter, positioned in front of an eye of a user.

One feature of the present disclosure is the elimination of moving parts, such as shutters. The camera or vision system of the present disclosure can be calibrated manually by having the user placing a hand in front of the lens assembly located in front of the infrared image sensor. Although manual calibration may not be desirable in certain cases, the elimination of additional components, such as mechanical automated shutters, reduces overall system cost and increases battery life of the image sensor.

Another feature of the present disclosure is that an integrated infrared sensor is coupled to a transparent heads-up display into the self-contained breathing apparatus lens without incorporating any adjustment features needed to accommodate for parallax correction and inter-pupil distance, along with a shutter-less camera which can be calibrated in the face piece lens.

Figure 1A:
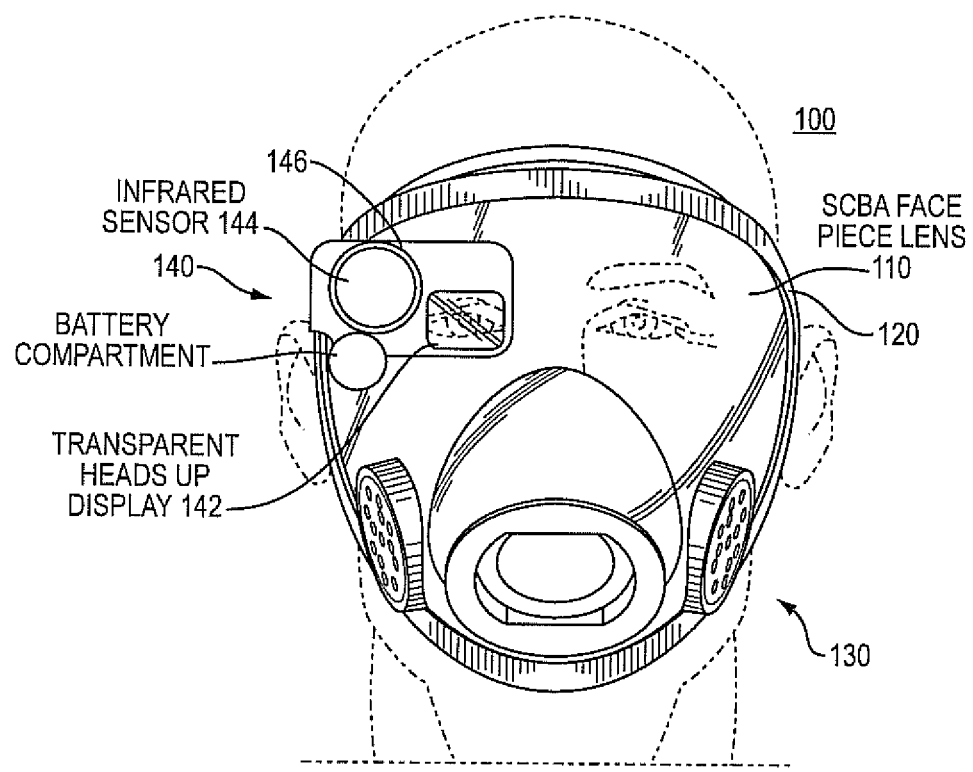
FIG. 1A illustrates a firefighter wearing a breathing apparatus in accordance with an embodiment of the present disclosure.
Figure 2:
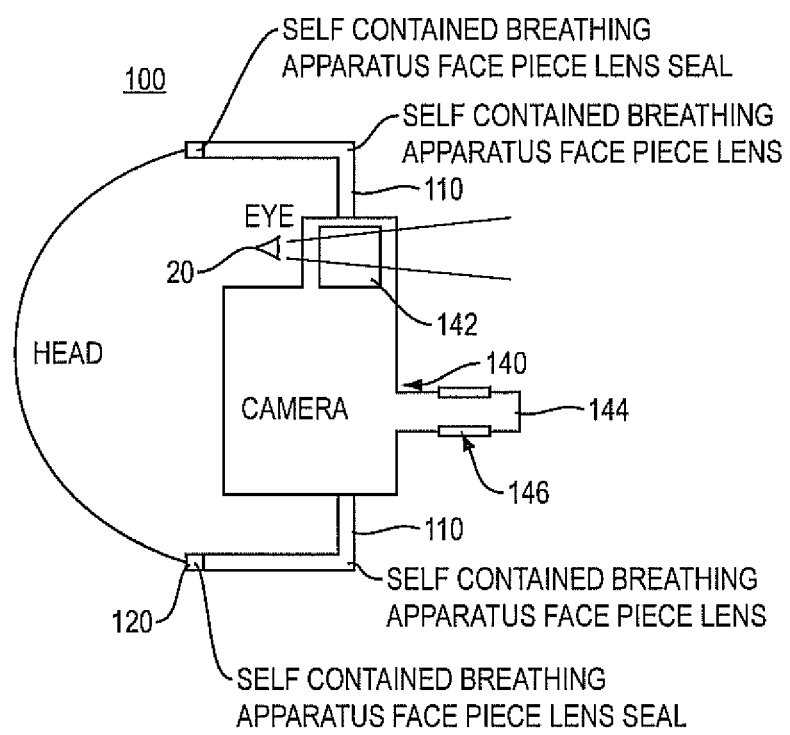
FIG. 2 illustrates a schematic diagram of a breathing apparatus having a vision system, in accordance with an embodiment of the present disclosure.

Hereafter, the present disclosure is described in more detail with reference to the accompanying drawings. FIG. 1A illustrates a firefighter wearing a self-contained breathing apparatus 100 (a.k.a., compressed air breathing apparatus) in accordance with an embodiment of the present disclosure. FIG. 2 illustrates a schematic diagram of a breathing apparatus 100 having a vision system 140, in accordance with an embodiment of the present disclosure.

Referring to both FIGS. 1A, and 2, breathing apparatus 100 includes a face piece lens 110, a seal component 120 at the edge of face piece lens 110, an air supply member 130 at a central portion of face piece lens 110 proximate the firefighter's nose and mouth, and a vision system 140 integrated with and securely fastened to a side of face piece lens 110. In one embodiment, seal component 120 may be made of fireproof rubber or a flexible tubular material running around the edge of the face piece lens 110 so as to ensure that, when breathing apparatus 100 is worn, air tight separation is formed between the space inside of face piece lens 110 and the surrounding environment.

In one embodiment, vision system 140 includes a transparent heads-up display 142 that is aligned with an eye 20 of a firefighter, an infrared sensor component 144 having an infrared lens assembly and an infrared image sensor for locating possible sources of fire or heat with respect to the eye 20 of the firefighter. In one embodiment, vision system 140 further includes a mechanical adjustment mechanism 146 which can be used to manually adjust a relative position between the infrared lens assembly and the infrared image sensor of infrared sensor component 144, so as to ensure that a captured infrared image is focused. In one embodiment, the vision system 140 has at a field of view 40 at an angle of about 10~45 degrees.

Figure 1B:
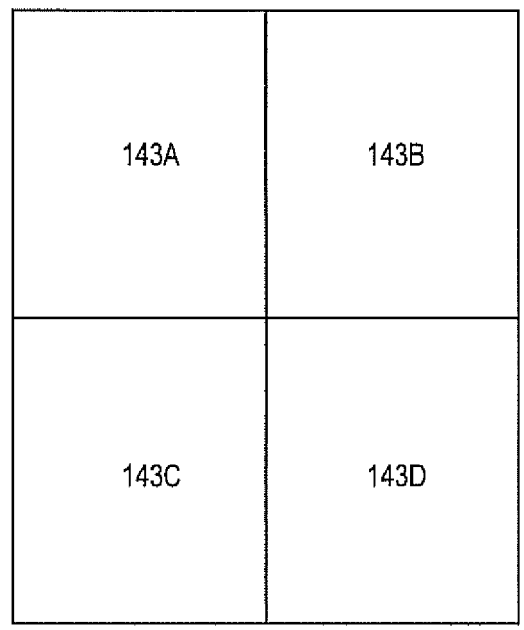
FIG. 1B schematically illustrates a display having multiple vision screens in accordance with an embodiment of the present disclosure.

FIG. 1B schematically illustrates a display having multiple vision screens in accordance with an embodiment of the present disclosure. As best seen in FIG. 1B, the display could be cube-shaped 143 and consist of multiple vision screens 143A, 143B, 143C and 143D so the fireman has multiple screens to see multiple images and can be aware of the surrounding environment to protect himself from harm in a fired building and the like.

Figure 3:
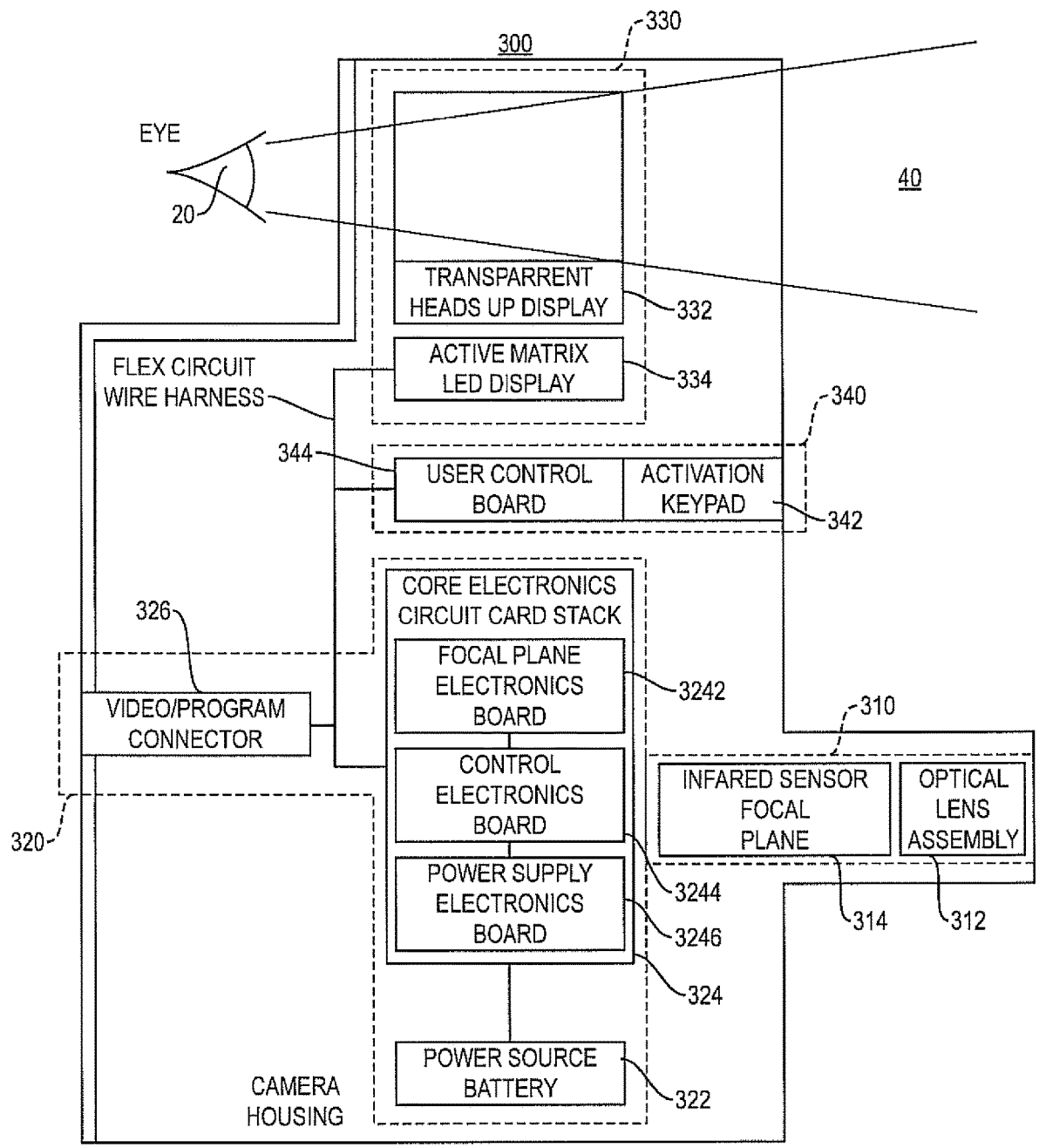
FIG. 3 illustrates a block diagram of the face piece vision system, in accordance with an embodiment of the present disclosure.

FIG. 3 illustrates a block diagram of the face piece vision system 300, in accordance with an embodiment of the present disclosure. As shown in FIG. 3, vision system 300 includes a sensor component 310, a core control component 320, a display component 330, and a user control interface 340. These components are enclosed in a housing 350 with selected portions being exposed exterior for signal input/output and for user interactions. As shown in FIG. 3, user control interface 340 includes an activation keypad 342 for receiving user interactions, and user control electronics 344 for converting the user interactions into electronic control signals.

Referring to FIG. 3, sensor component 310 includes an optical lens assembly 312 and an infrared image sensor 314. In one embodiment, optical lens assembly 312 is configured to project an optical image signal (infrared or visible, preferably infrared) to a focal plane where image sensor 314 is located. Image sensor 314 converts the optical image signal into an electrical input signal (e.g., an analog signal) and transmit the electrical input signal to core control component 320 for further processing.

Referring again to FIG. 3, core control component 320 includes a power supply 322 (e.g., one or more batteries), a core electronic circuit 324 electrically coupled to power supply 322, and a video output connector 326 electrically coupled to core electronic circuit 324. In one embodiment, core electronic circuit 324 further includes focal plane electronics 3242 electrically coupled to sensor component 310, control electronics 3244 for processing the electrical input signal, and power supply electronics 3246 electrically coupled to power supply 322 for regulating power. In one embodiment, core control component 320 processes the electronic input signal from sensor component 310, generates an electrical output signal (e.g., a digital signal) in accordance with the electrical input signal, and then transmits the electrical output signal to display component 310 and/or video output connector 326 for further processing. In one embodiment, the electrical output signal is formatted in accordance with a digital video or image standard that is suitable for being displayed by a display apparatus (e.g., display component 310, or an external display screen connected to video output connector 326).

Referring still to FIG. 3, display component 330 comprises a transparent heads-up display 332 and an active matrix display 334. Active matrix display 334 is electrically coupled to core control component 320 to receive the electrical output signal. In certain embodiments, active matrix display 334 can be an organic light emitting diode (OLED) display, a liquid crystal display (LCD), or any other suitable display devices. In one embodiment, active matrix display 334 projects an optical output signal to transparent heads-up display 332 in accordance with the electrical output signal received from core control component 320, thereby allowing the user to view the infrared image captured by sensor component 310.

In sum, the manner that the transparent heads-up display is positioned eliminates adjustment features and parts typically used for the compensation of inter-pupil distance human form factors. This is important because the same breathing apparatus is interchangeable between users or different shifts of users, without separating the unit from the lens which can easily result in dropping and damaging the sensor system. In other words, this technique eliminates the need for a modular, adjustable, or removable camera device or vision system.

Another common method to align the infrared scene to the user's eye is by shifting pixels in the X or Y direction to correct for parallax, or offset issues seen by the user when designing augmented reality systems like this. Such method is obsoleted by the disclosed approach of positioning the heads up display, as shown and described above.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. A self-contained breathing device comprising a face piece lens, a seal at an edge of the face piece lens, an air supply member at a central portion of the face piece lens, and a vision system embedded in the face piece lens and securely fastened to the face piece lens, wherein the vision system comprises:
    a single housing, wherein a portion of the vision system is exposed exterior to the face piece lens;
    a display enclosed in the single housing and having an active matrix display device and a transparent heads-up display for receiving optical output signals projected from the active matrix display device, wherein the transparent heads-up display is configured to be aligned with an eye of a user wearing the self-contained breathing device; and
    an infrared sensor enclosed in the single housing and having an infrared lens assembly and an infrared image sensor for capturing an infrared image of a potential heat source that is projected to the transparent heads-up display.

2. The device of claim 1, wherein the vision system comprises a shutter-less camera.

3. The device of claim 1, wherein the infrared sensor is coupled to the transparent heads-up display without incorporating adjustment features needed to accommodate for parallax correction and inter-pupil distance.

4. The device of claim 1, wherein the vision system comprises a user control interface having an activation keypad that receives user interactions, and user control electronics that controls the user interactions into electronic control signals.

5. The device of claim 1, wherein the vision system comprises core control electronics including a power supply, a core electronic circuit electrically coupled to the power supply, and a video output terminal electrically coupled to the core electronic circuit.

6. The device of claim 5, wherein the core control electronics include focal plane electronics electrically coupled to the infrared sensor, control electronics for processing an electrical input signal from the infrared sensor, and power supply electronics electrically coupled to the power supply for regulating power.

7. The device of claim 1, wherein the vision system is calibrated manually by placing a hand of the user in front of the infrared lens assembly of the infrared sensor.

8. The device of claim 1, wherein the display is configured to project multiple vision screens side-by-side to the transparent heads-up display.

* * * * *